(12) United States Patent
Fornage et al.

(10) Patent No.: US 9,048,744 B2
(45) Date of Patent: Jun. 2, 2015

(54) METHOD AND APPARATUS FOR RESONANT CONVERTER CONTROL

(75) Inventors: Martin Fornage, Petaluma, CA (US); Donald Richard Zimmanck, Petaluma, CA (US)

(73) Assignee: Enphase Energy, Inc., Petaluma, CA (US)

( * ) Notice: Subject to any disclaimer, the term of this patent is extended or adjusted under 35 U.S.C. 154(b) by 0 days.

(21) Appl. No.: 13/342,169

(22) Filed: Jan. 2, 2012

(65) Prior Publication Data

US 2012/0170324 A1 Jul. 5, 2012

Related U.S. Application Data

(60) Provisional application No. 61/460,470, filed on Jan. 3, 2011.

(51) Int. Cl.
*G05F 1/00* (2006.01)
*H02M 3/337* (2006.01)
*H02M 1/00* (2006.01)

(52) U.S. Cl.
CPC ...... *H02M 3/337* (2013.01); *H02M 2001/0058* (2013.01); *Y02B 70/1433* (2013.01); *Y02B 70/1491* (2013.01)

(58) Field of Classification Search
CPC .................................................. H02M 3/337
USPC .......................... 323/288, 242, 259, 326, 370; 363/21.02, 21.03, 21.09, 21.12, 21.15, 363/21.16, 21.17
See application file for complete search history.

(56) References Cited

U.S. PATENT DOCUMENTS

| | | |
|---|---|---|
| 4,012,682 A | 3/1977 | Carroll et al. |
| 4,363,243 A | 12/1982 | Poff |
| 4,417,477 A | 11/1983 | Poff |
| 4,459,532 A | 7/1984 | Schutten et al. |
| 4,459,535 A | 7/1984 | Schutten et al. |
| 4,469,999 A | 9/1984 | Swenson |
| 4,694,383 A | 9/1987 | Nguyen et al. |
| 4,706,175 A | 11/1987 | Schutten et al. |
| 4,706,183 A | 11/1987 | Schutten et al. |
| 5,550,498 A | 8/1996 | Kwan et al. |
| 5,652,503 A | 7/1997 | Urban et al. |
| 6,351,401 B1 | 2/2002 | Scheel et al. |
| 6,396,716 B1 | 5/2002 | Liu et al. |
| 7,050,312 B2 | 5/2006 | Tracy et al. |

(Continued)

FOREIGN PATENT DOCUMENTS

| | | |
|---|---|---|
| CN | 101546961 A | 9/2009 |
| EP | 0487970 A2 | 6/1992 |

(Continued)

OTHER PUBLICATIONS

International Search Report and Written Opinion mailed May 23, 2012 for PCT Application No. PCT/US2012/020006, 9 pgs.

*Primary Examiner* — Matthew Nguyen
*Assistant Examiner* — Trinh Dang
(74) *Attorney, Agent, or Firm* — Moser Taboada

(57) ABSTRACT

A method and apparatus for controlling resonant converter power production. In one embodiment, the method comprises determining accumulated charge processed by a resonant converter; dynamically determining a level of the accumulated charge that generates a predetermined output power; and controlling a switching cycle of the resonant converter based on the level of the accumulated charge.

20 Claims, 5 Drawing Sheets

(56) References Cited

U.S. PATENT DOCUMENTS

| | | |
|---|---|---|
| 7,088,601 B2 | 8/2006 | Tracy et al. |
| 7,113,405 B2 | 9/2006 | Armstrong et al. |
| 7,405,494 B2 | 7/2008 | Tassitino, Jr. et al. |
| 7,508,094 B2 | 3/2009 | Johnson, Jr. et al. |
| 7,561,451 B2 | 7/2009 | Tracy et al. |
| 7,583,109 B2 | 9/2009 | Oughton, Jr. et al. |
| 7,684,222 B2 | 3/2010 | Paatero |
| 7,800,924 B2 | 9/2010 | Oughton, Jr. et al. |
| 7,948,778 B2 | 5/2011 | Pfitzer et al. |
| 2005/0180175 A1* | 8/2005 | Torrey et al. ............. 363/17 |
| 2007/0024257 A1 | 2/2007 | Boldo |
| 2008/0136343 A1* | 6/2008 | Yu et al. ............. 315/219 |
| 2008/0239775 A1 | 10/2008 | Oughton et al. |
| 2008/0265681 A1 | 10/2008 | Pfitzer et al. |
| 2009/0196074 A1 | 8/2009 | Choi |
| 2009/0323380 A1 | 12/2009 | Harrison |
| 2010/0014322 A1 | 1/2010 | Harrison |
| 2010/0123405 A1* | 5/2010 | Yu et al. ............. 315/224 |
| 2010/0290174 A1 | 11/2010 | Harrison |
| 2011/0157927 A1 | 6/2011 | Adragna et al. |
| 2011/0181128 A1 | 7/2011 | Perreault et al. |
| 2011/0278932 A1 | 11/2011 | Navarro et al. |
| 2012/0038434 A1 | 2/2012 | Harrison |
| 2012/0068541 A1 | 3/2012 | Anderson |
| 2012/0074786 A1 | 3/2012 | Johnson, Jr. et al. |
| 2012/0086536 A1 | 4/2012 | Harrison |
| 2012/0092913 A1 | 4/2012 | Harrison |
| 2012/0139514 A1 | 6/2012 | Paatero |
| 2012/0153995 A1 | 6/2012 | Oughton, Jr. et al. |
| 2012/0320648 A1 | 12/2012 | Harrison et al. |

FOREIGN PATENT DOCUMENTS

| | | |
|---|---|---|
| EP | 1744140 A2 | 1/2007 |
| EP | 2079140 A1 | 7/2009 |
| RU | 2256284 C1 | 7/2005 |
| SU | 1713045 A1 | 2/1992 |
| WO | 200105659 A2 | 9/2001 |
| WO | 2006043837 A2 | 4/2006 |
| WO | 2008026938 A2 | 3/2008 |
| WO | 2010055282 A1 | 5/2010 |
| WO | 2011062508 A2 | 5/2011 |
| WO | 2011102910 A1 | 8/2011 |
| WO | 2012002824 A2 | 1/2012 |
| WO | 2012002825 A2 | 1/2012 |
| WO | 2012005604 A2 | 1/2012 |
| WO | 2012062375 A1 | 5/2012 |
| WO | 2012081998 A2 | 6/2012 |

* cited by examiner

US 9,048,744 B2

METHOD AND APPARATUS FOR RESONANT CONVERTER CONTROL

CROSS-REFERENCE TO RELATED APPLICATIONS

This application claims benefit of U.S. provisional patent application Ser. No. 61/460,470, filed Jan. 3, 2011, which is herein incorporated in its entirety by reference.

BACKGROUND OF THE INVENTION

1. Field of the Invention

Embodiments of the present disclosure relate generally to power conversion, and, in particular, to controlling power conversion in a resonant converter.

2. Description of the Related Art

Resonant power converters consist of a bridge (full or half), a resonant L-C network (i.e., tank), and a rectification circuit. The bridge excites a current in the resonant tank which is rectified into a direct current (DC) output. The rectification acts as a resistive-like load which changes the quality factor (Q) of the resonant tank. By changing the frequency of the bridge voltage, the impedance of the tank network seen by the bridge changes, thus varying the tank current and output power. Tank networks with high Q or networks with a "load independent point" will have large power swings over a relatively narrow frequency range, which can make it difficult for a controller to maintain stability.

Series resonant converters are designed to operate above resonance. At frequencies above the resonant frequency, the tank impedance looks inductive to the bridge and causes a tank current to lag behind the bridge voltage. When a bridge device turns off, this lagging current can be used to charge/discharge parasitic device capacitances to create zero-voltage switching. This is a well known technique for decreasing switching losses and allowing efficient operation of the converter at higher switching frequencies.

In traditional duty cycle controlled converters, one form of cycle-by-cycle control is accomplished through the control of peak current. Because the current waveform in traditional converters is always in phase with the switches, peak current control is a stable method of modulating power. Such a method is not suitable for resonant converters because the phase of the current with respect to the switch turn-off is unknown.

Therefore, there is a need in the art for a method and apparatus for cycle-by-cycle control of a resonant power converter.

SUMMARY OF THE INVENTION

Embodiments of the present invention generally relate to a method and apparatus for controlling resonant converter power production. In one embodiment, the method comprises determining accumulated charge processed by a resonant converter; dynamically determining a level of the accumulated charge that generates a predetermined output power; and controlling a switching cycle of the resonant converter based on the level of the accumulated charge.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
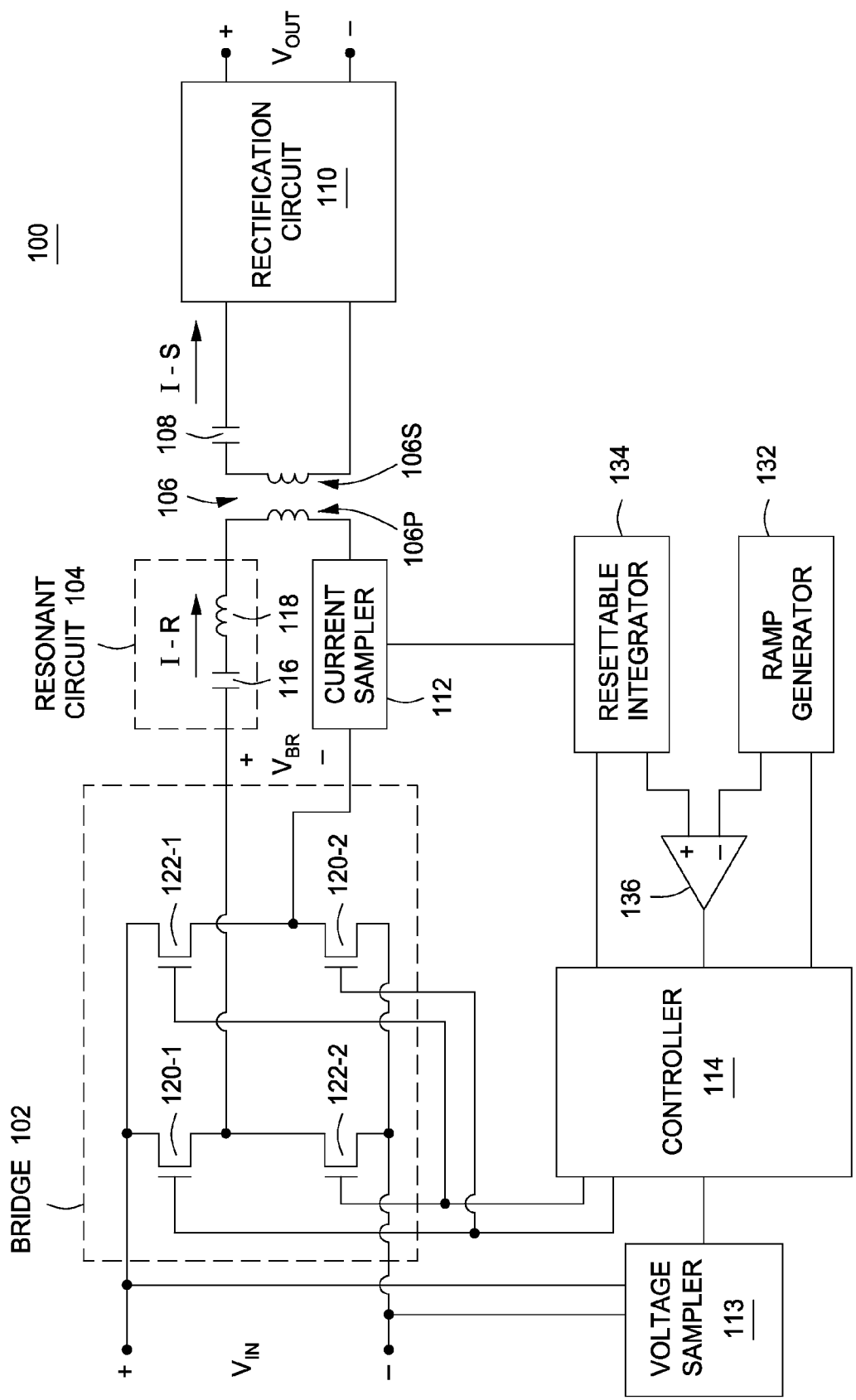
FIG. 1 is a block diagram of a resonant converter in accordance with one or more embodiments of the present invention.

FIG. 1 is a block diagram of a resonant converter 100 in accordance with one or more embodiments of the present invention. This diagram only portrays one variation of the myriad of possible system configurations. The present invention can function in a variety of power generation environments and systems.

The resonant converter 100 comprises an input bridge 102 ("bridge 102"), a resonant circuit 104, a transformer 106, an output capacitor 108, a rectification circuit 110, a current sampler 112, a voltage sampler 113, a controller 114, a ramp generator 132, a resettable integrator 134, and a comparator 136. The bridge 102 comprises switches 120-1, 120-2, 122-1, and 122-2, arranged in an H-bridge configuration such that switches 120-1/120-2 and 122-1/122-2 form first and second diagonals, respectively, of the H-bridge. Each of the switches 120-1, 120-2, 122-1, and 122-2 is coupled to the controller 114 for operatively controlling the switches. The switches 120-1, 120-2, 122-1, and 122-2 may be any suitable electronic switch, such as insulated gate bipolar transistors (IGBTs), bipolar junction transistors (BJTs), metal-oxide-semiconductor field-effect transistors (MOSFET), gate turnoff thyristors (GTOs), and the like. In some embodiments, the controller 114 may be coupled to both gate and source terminals of each of the switches 120-1, 120-2, 122-1, and 122-2 for providing operative control. In other embodiments, different types of input bridge structures may be used for generating an appropriate bridge output voltage as described below.

A first output terminal of the bridge 102 is coupled between the switches 120-1 and 122-2, and is also coupled to a first terminal of a capacitor 116. A second terminal of the capacitor 116 is coupled to a first terminal of an inductor 118, and a second terminal of the inductor 118 is coupled to a first terminal of a primary winding 106P of the transformer 106. The capacitor 116 and the inductor 118 form a series resonant circuit 104; in some alternative embodiments, other types of resonant circuits (e.g., other types of series resonant circuits or parallel resonant circuits) may be utilized in place of the resonant circuit 104 within the resonant converter 100. The current sampler 112 is coupled between a second terminal of the primary winding 106P and a second output terminal of the bridge 102, which is coupled between the switches 122-1 and 120-2. The current sampler 112 is further coupled to the resettable integrator 134. The voltage sampler 113 is coupled across the input to the bridge 102 and further to the controller 114.

On the secondary side of the transformer 106, a first terminal of a secondary winding 106S is coupled to a first terminal of the output capacitor 108. The rectification circuit 110 is coupled between a second terminal of the output capacitor 108 and a second terminal of the secondary winding 106S. The rectification circuit 110 may be any suitable circuit known in the art for performing rectification (e.g., a full wave rectifier or a half wave rectifier).

The controller 114, in addition to being coupled to the switches 120-1, 120-2, 122-1, and 122-2, is coupled to the ramp generator 132, the resettable integrator 134, and the comparator 136. The comparator 136 is also coupled to the ramp generator 132 and the resettable integrator 134.

The bridge 102 receives an input voltage Vin from a DC voltage source, such as one or more renewable energy sources (e.g., photovoltaic (PV) modules, wind farms, hydroelectric systems, or the like), batteries, or any suitable source of DC power. The controller 114 alternately activates/deactivates the H-bridge diagonals (i.e., 180° out of phase) to generate a bridge output voltage Vbr that is a bipolar square wave having a duty cycle D. As a result of the voltage Vbr, a sinusoidal current I-R flows through the resonant circuit 104 and the primary winding 106P. The alternating current through the primary winding 106P induces an alternating current I-S in the secondary winding 106S, which flows through the rectification circuit 110 to generate a DC output voltage Vout, where Vout=αVin and α is proportional to the turns ratio between 106P and 106S.

The current sampler 112 samples the current I-R and generates values indicative of the sampled current ("current samples"). In some embodiments, the current sampler 112 comprises an analog-to-digital converter (ADC) for generating the current samples in a digital format. The current sampler 112 couples the current samples to the resettable integrator 134 for integrating the current I-R over time. The voltage sampler 113 samples the input voltage Vin, generates values indicative of the sampled input voltage Vin ("input voltage samples"), and couples the input voltage samples to the controller 114. In some embodiments, the voltage sampler 113 may comprise an ADC for generating the samples in a digital format The resettable integrator 134 couples an output indicative of the integrated current to a first input, e.g., a non-inverting input, of the comparator 136. The resettable integrator 134 receives an appropriate signal from the controller 114 to reset the resettable integrator 134, for example during each switching period.

The ramp generator 132 generates a ramp waveform with respect to time, i.e., a linearly increasing voltage, and couples an output signal indicative of the ramp waveform value to a second input, e.g., an inverting input, of the comparator 136. The comparator 136 generates an output signal based upon the relative levels of the received integrated current and ramp waveform values. When the value of the ramp waveform exceeds the value of the integrated current, the comparator 136 generates a first output signal; when the value of the integrated current becomes equal to and exceeds the value of the ramp waveform, the comparator 136 generates a second output signal. The output from the comparator 136, which indicates whether the integrated current or the ramp waveform is greater at a given time, is coupled to the controller 114.

In accordance with one or more embodiments of the present invention, charge mode control is used to dynamically control cycle-by-cycle power generation from the converter 100, regardless of the phase of the current I-R through the resonant circuit 104. During a first half of a switching period T, the controller 114 activates the bridge 102 and monitors the accumulation of charge through the resonant circuit 104 (i.e., the integrated current). Once the accumulated charge is sufficient to provide a desired output power Pout, the controller 114 deactivates the bridge 102. As described in detail below with respect to FIG. 3, the accumulated charge is sufficient to produce the desired output power Pout when it is equal to (Pin*Ton)/(D*Vin), where Pin is the converter input power required to achieve the desired output power Pout (i.e., Pin is equal to the desired output power divided by the converter efficiency), Vin is the measured converter input voltage, D is the duty cycle for the bridge voltage waveform, and Ton is an "on" time for the bridge voltage waveform (i.e., an activation time for the bridge 102).

By modeling the instantaneous period (i.e., Ton) as a ramp waveform via the ramp generator 132, the slope of the generated ramp may be set as Pin/(D*Vin) and the values of the ramp waveform and the integrated current may be compared at the comparator 136 to determine when the charge accumulation is sufficient to produce the desired output power Pout. As the integrated current value increases, it eventually intersects and surpasses the ramp; at the point of intersection, i.e., when the corresponding values of the ramp waveform and the integrated current at a particular time are equal, sufficient power has been put into the converter 100 for the current switching half-period to achieve the desired output power Pout. As the integrated current value increases, it eventually intersects and surpasses the ramp, causing the output from the comparator 136 to change and trigger the controller 114 to deactivate the bridge 102 for the remainder of the switching half-period.

During the second half of the switching period T, the controller 114 may activate the previously inactive bridge diagonal by any suitable technique to generate an equal but opposite polarity bridge waveform. For example, in some embodiments a simple mirror may be used (e.g., employing a timer) to drive the bridge 102 during the latter half of the switching period T such that the bridge waveforms during the first and second switching period halves are equal but of opposite polarity. In some other embodiments, the previously inactive bridge diagonal may be activated during the second half of the switching period T and, analogous to the operation described above, the integrated resonant circuit current is compared to the generated ramp waveform to deactivate the bridge 102 when the two become equal. In such embodiments, the polarity of either the ramp waveform or the integrated current is reversed prior to the comparison; for example, the controller 114 may signal the resettable integrator 134 or the ramp generator 132 to reverse the output polarity during the appropriate switching half-period. In some alternative embodiments, a second controller, analogous to the controller 114, may be used to drive the bridge 102 to generate the appropriate bridge voltage Vbr during the second half of the switching period T.

In one particular embodiment, both the resettable integrator 134 and the ramp generator 132 are initialized at the beginning of a switching period T and the switches 120-1/120-2 are activated to produce a positive bridge voltage Vbr. The linear ramp waveform from the ramp generator 132 begins increasing positively from an initial value of zero and, as a result of the positive Vbr, the value of the integrated resonant current eventually increases positively at a rate greater than the ramp waveform. As the ramp waveform and the integrated current increase over time they eventually intersect, thereby indicating that sufficient power has been put into the converter 100 for the current switching half-period. The point of intersection may be controlled by adjusting the slope of the ramp waveform; a steeper ramp slope results in a longer on-time for the switches 120-1/120-2 and a greater output power Pout. The output signal from the comparator 136 changes from one level to another as the value of the integrated current becomes equal to and begins to surpass the value of the ramp waveform, signaling the controller 114 to deactivate the currently active switch pair 120-1/120-2. The bridge 102 then remains inactive (i.e., Vbr is equal to zero) for the remainder of the switching half-period as determined by the duty cycle D, which may be set in the controller 114.

In addition to controlling the operation of the bridge 102 based on the integrated resonant circuit current and the generated ramp waveform, the controller 114 determines and adjusts the slope of the ramp waveform, for example during each switching cycle, in order to dynamically achieve the cycle-by-cycle control of the power transferred to the output. As the ramp slope is increased, the amount of output power increases; as the ramp slope decreases, the amount of output power decreases. The ramp waveform slope may be adjusted to control each switching cycle of the resonant converter 100 to achieve a desired output power Pout based on current operating parameters. For a known input voltage Vin, the slope of the ramp waveform may be determined based on a desired duty cycle D and a Pin that will result in a desired output power level, as described below with respect to FIG. 3. The controller 114 is coupled to the ramp generator 132 and provides the appropriate signals to the ramp generator 132 for adjusting the slope as needed during each switching cycle. In some alternative embodiments, the outputs from the ramp generator 132 and the resettable integrator 134 may be coupled to the controller 114 and the controller 114 compares the integrated current to the ramp.

Figure 2:
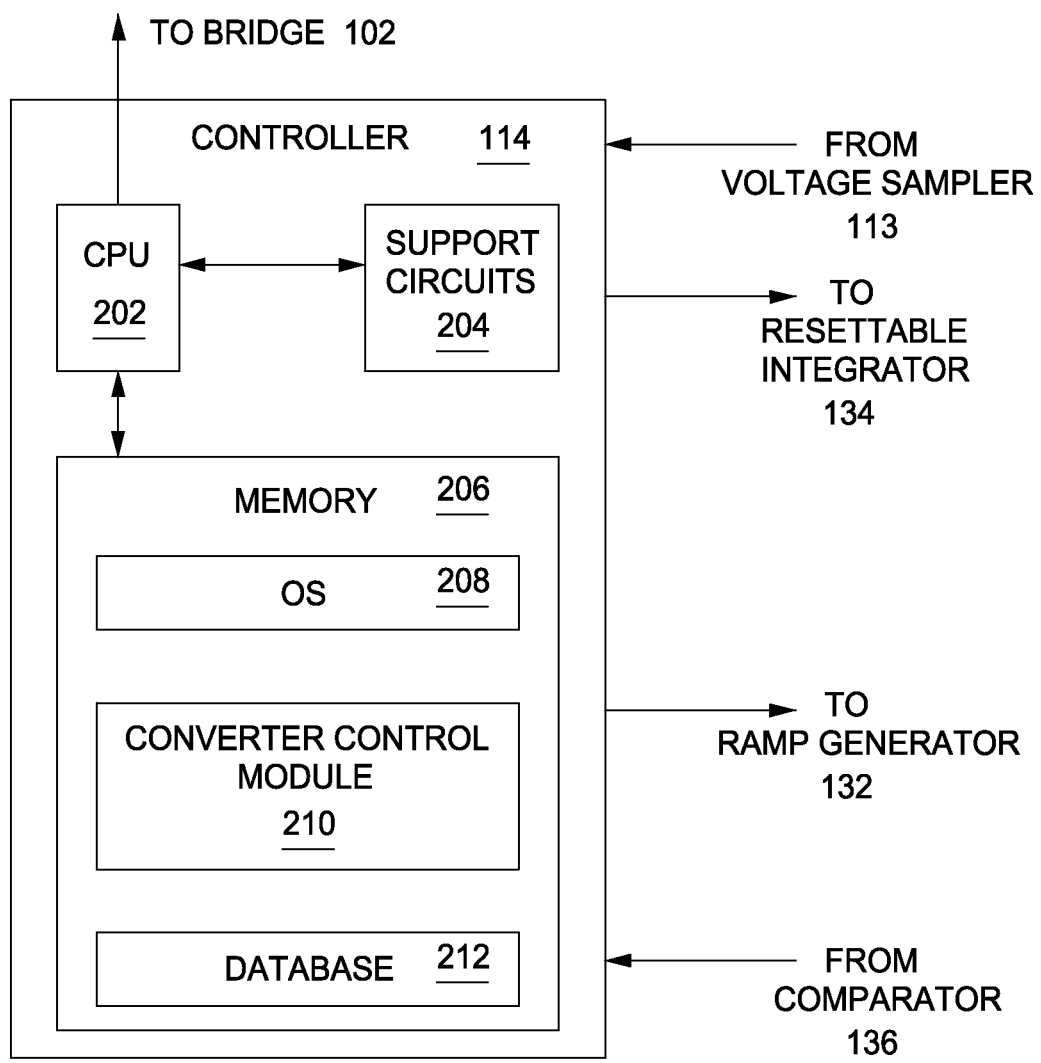
FIG. 2 is a block diagram of a controller in accordance with one or more embodiments of the present invention.

FIG. 2 is a block diagram of a controller 114 in accordance with one or more embodiments of the present invention. The controller 114 comprises support circuits 204 and a memory 206, each coupled to a central processing unit (CPU) 202. The CPU 202 may comprise one or more conventionally available microprocessors or microcontrollers; alternatively, the CPU 202 may include one or more application specific integrated circuits (ASICs). The support circuits 204 are well known circuits used to promote functionality of the CPU 202. Such circuits include, but are not limited to, a cache, power supplies, clock circuits, buses, input/output (I/O) circuits, and the like. The controller 114 may be implemented using a general purpose computer that, when executing particular software, becomes a specific purpose computer for performing various embodiments of the present invention.

The memory 206 may comprise random access memory, read only memory, removable disk memory, flash memory, and various combinations of these types of memory. The memory 206 is sometimes referred to as main memory and may, in part, be used as cache memory or buffer memory. The memory 206 generally stores the operating system (OS) 208 of the controller 114 that can be supported by the CPU capabilities.

The memory 206 may store various forms of application software, such as a converter control module 210 for controlling operation of the bridge 102 and performing functions related to the present invention, such as computing a ramp slope, setting a ramp slope in the ramp generator 132, activating/deactivating the bridge switches (e.g., based on signals received from the comparator 136), resetting the resettable integrator 134, initializing the ramp generator 132 (i.e., to generate a new ramp waveform from an initial value of zero), providing signals to the resettable integrator 134 and/or the ramp generator 132 for changing polarity of an output, and the like. The memory 206 may additionally store a database 212 for storing data related to the operation of the resonant converter 100 and/or the present invention, such as a duty cycle D, a desired output power Pout, a computed ramp slope, a conversion efficiency e of the converter 100, and the like.

In other embodiments, the CPU 202 may be a microcontroller comprising internal memory for storing controller firmware that, when executed, provides the controller functionality described below.

Figure 3:
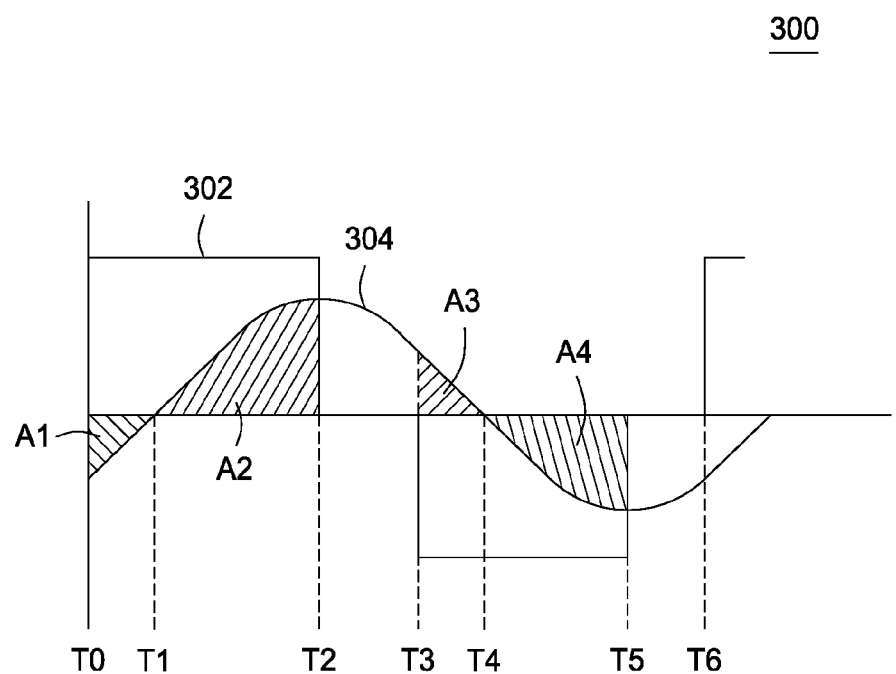
FIG. 3 is a graph depicting primary side current and voltage for a resonant converter in accordance with one or more embodiments of the present invention.

FIG. 3 is a graph 300 depicting primary side current and voltage waveforms for a resonant converter 100 in accordance with one or more embodiments of the present invention. The graph 300 can be utilized for determining a formula for a slope of the ramp utilized in the switching control of the bridge 102.

The graph 300 comprises a bridge voltage waveform 302 depicting the resonant converter bridge voltage Vbr over time, and a resonant circuit current waveform 304 (also referred to as "tank current waveform 304") depicting the current I-R through the resonant circuit 104 over time. The bridge voltage waveform 302 is a bipolar square wave having a duty cycle D, and the tank current waveform 304 is a substantially sinusoidal waveform phase-shifted with respect to the bridge voltage waveform 302.

At time T0, the switches 120-1/120-2 are activated while the switches 122-1/122-2 are inactive; the bridge voltage waveform 302 is at a positive value and the tank current waveform 304 is at a negative value increasing toward zero. At time T1, the bridge voltage waveform 302 remains at the positive value, and the tank current waveform 304 crosses zero; a cross-hatched area A1 depicts the area under the tank current waveform 304 from T0 to T1. At time T2, the switch 120-1 is deactivated while the switch 120-2 remains activated and the switch 122-2 is activated, effectively shorting the tank and resulting in a bridge voltage waveform 302 of zero volts. The tank current waveform 304 is at a positive value, and a cross-hatched area A2 depicts the area under the tank current waveform 304 from T1 to T2. At time T3, the switch 122-1 is activated, the switch 122-2 remains activated, the switch 120-1 remains inactive, the switch 120-2 is deactivated, and the bridge voltage waveform 302 drops to a negative value. The tank current waveform 304 is at a positive value sinusoidally decreasing toward zero.

At time T4, the bridge voltage waveform 302 remains at the negative value, and the tank current waveform 304 crosses zero; a cross-hatched area A3 depicts the area under the tank current waveform 304 from T3 to T4. At time T5, the switches 122-1/122-2 are deactivated and the bridge voltage waveform 302 rises to zero. The tank current waveform 304 is at a negative value, and a cross-hatched area A4 depicts the area under the tank current waveform 304 from T4 to T5. At time T6, the switches 120-1/120-2 are activated while the switches 122-1/122-2 remain inactive; the bridge voltage waveform 302 rises to a positive value, and the tank current waveform 304 is at a negative value sinusoidally increasing toward zero.

The input power Pin to the resonant converter 100 can be expressed based on the areas A1, A2, A3, and A4 as follows:

$$Pin = \frac{Vin * [(A2 + A4) - (A1 + A3)]}{T} \qquad (1)$$

where Pin is an input power level that will result in a desired output power level Pout and $[(A2+A4)-(A1+A3)]$ is the accumulation of charge during the switching period T. The relationship between the input power Pin and the output power Pout may be expressed as Pout=ϵ*Pin, where ϵ is a conversion efficiency of the resonant converter 100.

Since the resonant converter 100 is a full bridge converter operating in symmetric clamped mode, the bridge waveforms are running in symmetric mode and the switches 120-1/120-2 and 122-1/122-2 are operating 180° out of phase; thus the area A2 is equivalent to the area A4, and the area A1 is equivalent to the area A3. Further, the switch period T can be expressed in terms of an on time Ton for each diagonal and the duty cycle D, i.e., T=2*Ton/D, giving the equation:

$$Pin = \frac{Vin * D * [2(A2 - A1)]}{T * Ton} \quad (2)$$

Equation (2) can be rearranged as follows:

$$\frac{Pin * 2 * Ton}{2 * D * Vin} = A2 - A1 \quad (3)$$

The difference between the areas A2 and A1 is equivalent to the integral of the tank current waveform 304 from T0 to T2:

$$\frac{Pin * 2 * Ton}{2 * D * Vin} = \int Itank \quad (4)$$

The on-time Ton can be approximated by a ramp function f-ramp that models the instantaneous period:

$$\frac{Pin * framp}{D * Vin} = \int Itank \quad (5)$$

For a known (i.e., measured) input voltage Vin, a desired duty cycle D, and a required Pin to achieve a desired output power Pout, the ramp slope Pin/D*Vin may be computed and utilized to achieve the desired output power Pout during a given switching cycle. In some embodiments, the controller 114 (e.g., the converter control module 210) may compute a suitable value for the ramp slope and set the ramp slope in the ramp generator 132 based on the computed value. In one or more alternative embodiments, Equation (2) may be digitally implemented (e.g., in the converter control module 210) and the bridge 102 deactivated for a switching half-period when the desired Pin is reached.

Figure 4:
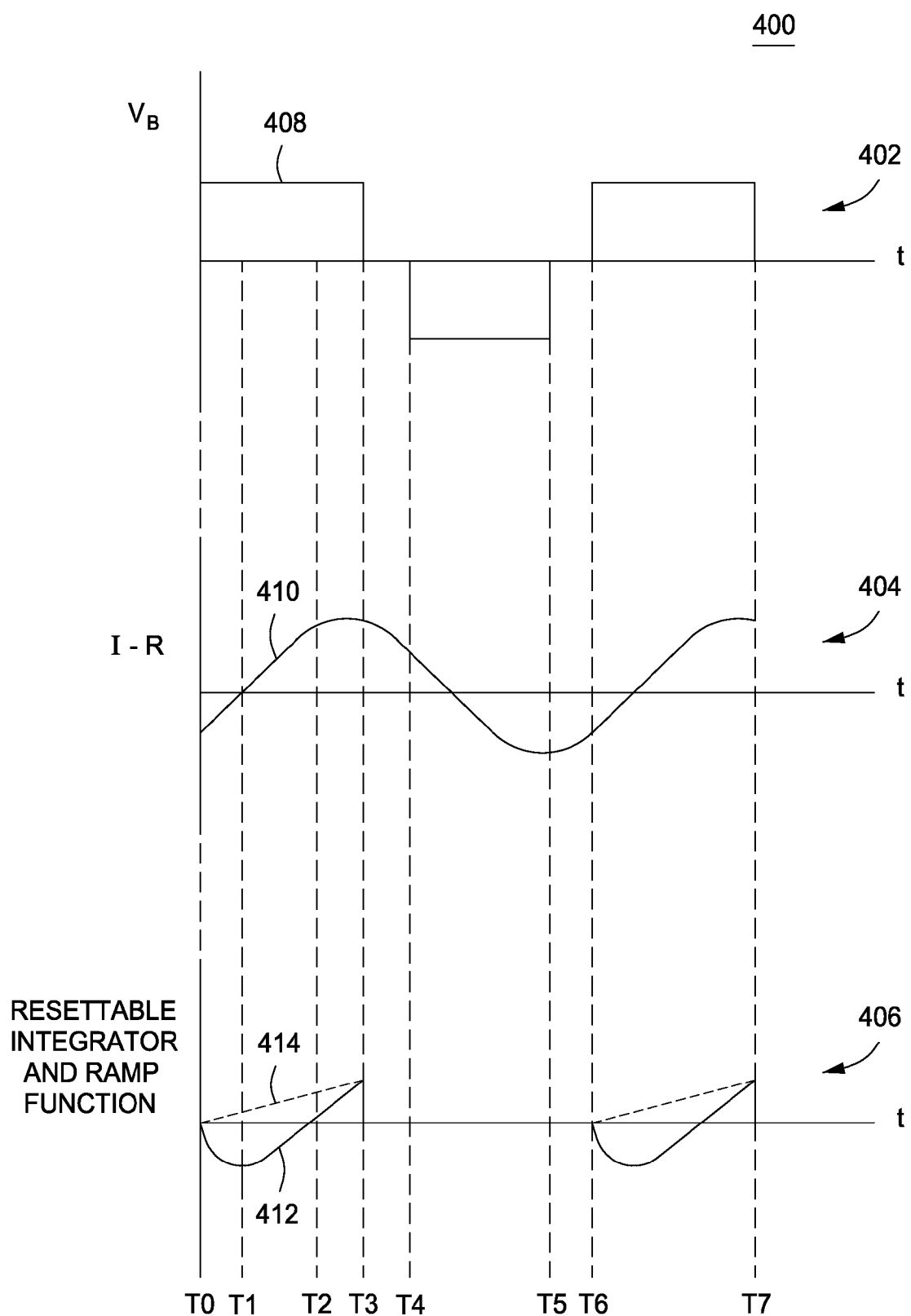
FIG. 4 is a set of graphs depicting a plurality of waveforms associated with the operation of the resonant converter in accordance with one or more embodiments of the present invention.

FIG. 4 is a set of graphs 400 depicting a plurality of waveforms associated with the operation of the resonant converter 100 in accordance with one or more embodiments of the present invention. The set of graphs 400 comprises a graph 402, a graph 404, and a graph 406. The graph 402 comprises a bipolar square waveform 408 depicting a voltage Vbr across the bridge 102 over time ("bridge voltage 408"). Graph 404 comprises a substantially sinusoidal waveform 410 depicting a current I-R through the resonant circuit 104 over time ("tank current 410"). Graph 406 comprises a waveform 412 depicting the integrated current I-R over time ("integrated current 412") and a waveform 414 depicting the ramp waveform over time ("ramp waveform 414").

At time T0, a first switching cycle begins and the switches 120-1/120-2 are activated while the switches 122-1/122-2 are inactive, generating a bridge voltage 408 at a positive value. The tank current 410 is at a negative value that is sinusoidally increasing toward zero. The integrated current 412 is zero and begins negatively increasing, and the ramp waveform 414 is zero and begins linearly increasing with a slope as previously described with respect to FIG. 3.

At time T1, the bridge voltage 408 remains steady. The tank current 410 crosses zero as it sinusoidally increases. The integrated current 412 is negative with a slope of zero as it begins to increase. The ramp waveform 414 is positive and continues to linearly increase.

At time T2, the bridge voltage 408 remains steady. The tank current 410 continues to sinusoidally increase. The integrated current 412 crosses zero and increases, while the ramp waveform 414 continues to linearly increase. At time T3, the integrated current 412 and the ramp waveform 414 are equal; the switch 120-1 is deactivated while the switch 120-2 remains activated (although in other embodiments both switches may be deactivated). The switch 122-2 is activated once the bridge voltage 408 drops to zero (i.e., zero voltage switching). The tank current 410 is sinusoidally decreasing. The integrated current 412 and the ramp waveform 414 are reset to zero; in other embodiments, the integrated current 412 and/or the ramp waveform 414 may be reset to zero at a later time within the current switching period but prior to the beginning of the next switching period.

From T3 to T4, the bridge voltage 408, the integrated current 412, and the ramp waveform 414 remain at zero, while the tank current 410 continues sinusoidally decreasing. At time T4, which is determined based on the duty cycle D being used, the switch 122-1 is activated, the switch 122-2 remains activated, the switch 120-1 remains inactive, and the switch 120-2 is deactivated, causing the bridge voltage 408 to drop to a negative value. The tank current 410 continues sinusoidally decreasing, and the integrated current 412 and ramp waveform 414 remain at zero.

At time T5, the time from T4 to T5 being equal to the time from T0 to T3, the switches 122-1/122-2 are deactivated and the bridge voltage 408 changes to zero. The tank current 410 is negative and sinusoidally increasing. From T5 to T6, the time from T5 to T6 being equal to the time from T3 to T4, the bridge voltage 408 is zero, the tank current 410 continues increasing, and both the integrated current 412 and the ramp waveform 414 are equal to zero.

At time T6, a second switching cycle begins. The switches 120-1/120-2 are activated and switches 122-1/122-2 remain deactivated to generate a positive bridge voltage 408. The tank current 410 is at a negative value that is sinusoidally increasing toward zero. The integrated current 412 is zero and begins negatively increasing, and the ramp waveform 414 is zero and begins linearly increasing. Analogous to the operation during the time T0 to T3, the switches 120-1/120-2 remain activated until the integrated current 412 and the ramp waveform 414 become equal at T7, at which time the switches 120-1/120-2 are deactivated. The slope of the ramp waveform 414 during the second switching cycle may be different from the slope of the ramp waveform 414 during the first switching cycle (i.e., the time from T6 to T7 may be less than or greater than the time from T0 to T3) based on a desired change in output power during the second switching cycle.

Figure 5:
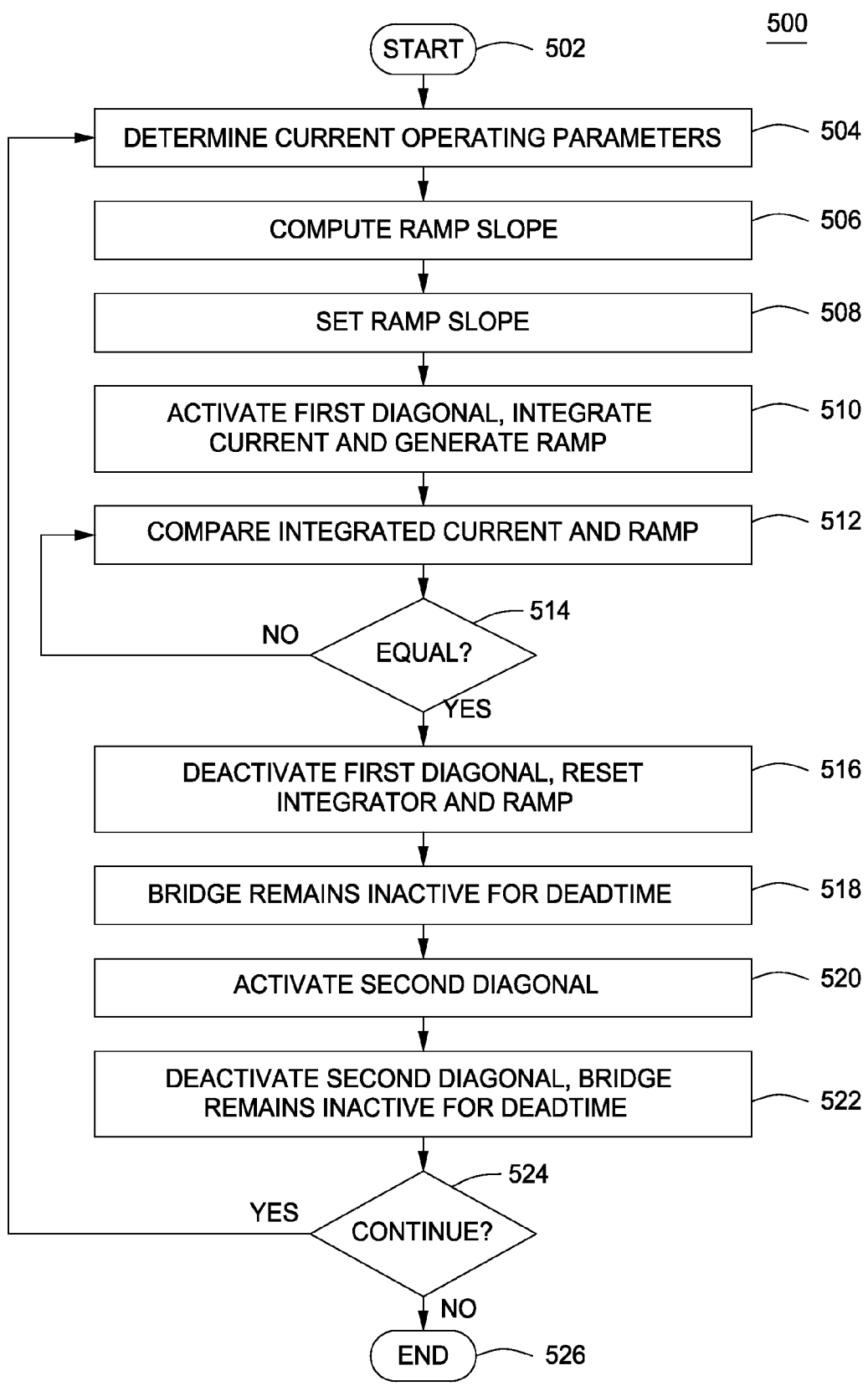
FIG. 5 is a flow diagram of a method for cycle-by-cycle control of a resonant power converter in accordance with one or more embodiments of the present invention.

FIG. 5 is a flow diagram of a method 500 for dynamic cycle-by-cycle control of a resonant power converter in accordance with one or more embodiments of the present invention. In some embodiments, such as the embodiment described below, the resonant converter is a full-bridge converter operating in a symmetric clamped mode (e.g., the resonant converter 100). The resonant converter comprises a resonant circuit, such as the series resonant circuit 104; in other embodiments, the resonant circuit may be another type of resonant circuit, such as a parallel resonant circuit. The resonant converter may further comprise a resettable integrator for integrating a current through the resonant circuit, a ramp generator for generating a linear ramp waveform, and a comparator for comparing the integrated current to the generated ramp (e.g., for comparing signals indicative of the integrated current and ramp values), although in other embodiments other means may be utilized for performing the functions with respect to the method 500.

The method 500 begins at step 502 and proceeds to step 504. At step 504, converter operating parameters of desired output power, required input power, a desired switching waveform duty cycle, and input voltage are determined. The required input power is the power to the resonant converter that will achieve the desired output power; i.e., the converter's efficiency e and the desired output power may be used to determine the required input power. The method 500 proceeds to step 506, where a slope for the ramp waveform is computed. The ramp slope may be determined as previously described with respect to FIG. 3 based on the required input power, the input voltage to the resonant converter, and the desired duty cycle for the switching period.

At step 508, the slope of the ramp to be generated by the ramp generator is set based on the computed value. The method 500 proceeds to step 510, where a first switching cycle begins by activating a first diagonal of the resonant converter's input bridge to generate a bridge voltage of a first polarity, such as a positive bridge voltage. As a result of the bridge voltage, a substantially sinusoidal current flows through the resonant circuit on the primary side of the resonant converter. The resettable integrator begins integrating the current through the resonant circuit (i.e., the resettable integrator determines the accumulated charge), and the ramp generator begins generating the ramp waveform. The method 500 proceeds to step 512.

At step 512, the integrated current (i.e., the accumulated charge) is compared to the ramp waveform by comparing their corresponding values which occur at a particular time. In some embodiments, values indicative of the integrated current and the ramp waveform are coupled to a comparator, such as comparator 136, for the comparison. At step 514, a determination is made whether the values of the integrated current and the ramp waveform are simultaneously equal. If, at step 514, it is determined that the integrated current and the ramp waveform are not equal, the method 500 returns to step 512. If, at step 514, it is determined that the integrated current and the ramp waveform are equal, the method 500 proceeds to step 516.

At step 516, the first diagonal is deactivated. As a result of both bridge diagonals being inactive, the bridge voltage drops to zero. In some embodiments, the integrator and the ramp are both reset (i.e., the values of each are reset to zero); in some alternative embodiments, the integrator and/or the ramp are reset at a later time during the switch period but prior to the next switch period. The method 500 proceeds to step 518, where the resonant converter input bridge remains inactive for a deadtime as determined by the selected duty cycle. The method 500 then proceeds to step 520, where the second diagonal is activated to generate a bridge voltage of a second polarity, such as a negative bridge voltage. The second diagonal remains activated for a time equivalent to the activation time of the first diagonal. As previously described above, the second diagonal may be activated by any suitable technique to generate a bridge waveform equal but opposite in polarity to the bridge waveform generated when the first diagonal was active. For example, in some embodiments a simple mirror may be used; in other embodiments, the resonant circuit current may be integrated and compared to a generated ramp waveform, where the polarity of either the ramp waveform or the integrated current is reversed prior to the comparison. The method 500 then proceeds to step 522 where the second diagonal is deactivated and the bridge remains inactive for a deadtime, equivalent to the deadtime following deactivation of the first diagonal, as determined by the selected duty cycle.

The method 500 proceeds to step 524, where a determination is made whether to continue operation of the resonant converter. If, at step 524, it is determined to continue operating the resonant converter, the method 500 returns to step 504 to determine any operating parameter changes for the next switching period and to adjust the ramp slope as necessary based on operating parameter changes. The method 500 thus provides cycle-by-cycle control of the output power from the resonant converter.

If, at step 524, it is determined to discontinue operating the resonant converter, the method 500 proceeds to step 526 where it ends.

The foregoing description of embodiments of the invention comprises a number of elements, devices, circuits and/or assemblies that perform various functions as described. These elements, devices, circuits, and/or assemblies are exemplary implementations of means for performing their respectively described functions. For example, the integrator is an example of a means for integrating a current to determine accumulated charge processed by the resonant converter, the ramp generator is an example of a means for generating a ramp waveform, and the controller is an example of a means for controlling a switching cycle of the resonant converter based on a level of the accumulated charge that generates a predetermined output power. Additionally, the comparator is an example of a means for comparing accumulated charge to a ramp waveform, and also for coupling a signal to the controller based on a result of comparing the accumulated charge to the ramp waveform.

While the foregoing is directed to embodiments of the present invention, other and further embodiments of the invention may be devised without departing from the basic scope thereof, and the scope thereof is determined by the claims that follow.

The invention claimed is:

1. A method for controlling a resonant converter power production, comprising:
monitoring an integrated current, during a conduction period of a switching bridge, to determine an amount of accumulated charge through a resonant circuit of a resonant converter;
dynamically determining, during the conduction period and based on the integrated current, when the amount of the accumulated charge is sufficient to generate a predetermined output power from the resonant converter; and
deactivating the switching bridge when the amount of the accumulated charge is sufficient to generate the predetermined output power, wherein the integrated current is reset each switching cycle of the switching bridge.

2. The method of claim 1, wherein dynamically determining when the amount of the accumulated charge is sufficient comprises comparing the integrated current to a model of an instantaneous period for the switching bridge.

3. The method of claim 2, wherein the instantaneous period is modeled by a ramp waveform.

4. The method of claim 3, wherein the ramp waveform is reset each switching cycle of the switching bridge.

5. The method of claim 3, wherein a slope of the ramp waveform is based on the predetermined output power.

6. The method of claim 3, wherein a slope of the ramp waveform is adjustable each switching cycle of the switching bridge 1, wherein circuit of the resonant converter.

7. The method of claim 5, wherein the slope is equal to (Pin)/(D*Vin), where Pin is equal to the predetermined output power divided by an efficiency of the resonant converter, Vin is an input voltage to the resonant converter, and D is a duty cycle for a switching waveform of the resonant converter.

8. An apparatus for controlling a resonant converter power production, comprising:
   an integrator for integrating a current, during a conduction period of a switching bridge, to generate an integrated current to determine an amount of accumulated charge through a resonant circuit of a resonant converter; and
   a controller for (i) dynamically determining, during the conduction period and based on the integrated current, when the amount of the accumulated charge is sufficient to generate a predetermined output power from the resonant converter, and (ii) deactivating the switching bridge when the amount of the accumulated charge is sufficient to generate the predetermined output power, wherein the integrated current is reset each switching cycle of the switching bridge.

9. The apparatus of claim 8, wherein dynamically determining when the amount of the accumulated charge is sufficient comprises comparing the integrated current to a model of an instantaneous period for the switching bridge waveform.

10. The apparatus of claim 9, further comprising a ramp generator for generating a ramp waveform as the model.

11. The apparatus of claim 10, further comprising a comparator for (a) comparing the integrated current to the ramp waveform and (b) coupling a signal to the controller based on a result of comparing the integrated current to the ramp waveform.

12. The apparatus of claim 10, wherein a slope of the ramp waveform is based on the predetermined output power.

13. The apparatus of claim 10, wherein a slope of the ramp waveform is adjustable each switching cycle of the switching bridge.

14. The apparatus of claim 11, wherein the input bridge is the ramp waveform is reset each switching cycle of the switching bridge.

15. The apparatus of claim 12, wherein the slope is equal to (Pin)/(D*Vin), where Pin is equal to the predetermined output power divided by an efficiency of the resonant converter, Vin is an input voltage to the resonant converter, and D is a duty cycle for a switching waveform of the resonant converter.

16. A system for controlling a resonant converter power production, comprising:
   a photovoltaic (PV) module; and
   a resonant converter, coupled to the PV module, comprising:
      an input bridge;
      an integrator for integrating a current, during a conduction period of the input bridge, to generate an integrated current to determine an amount of accumulated charge through a resonant circuit of the resonant converter;
      a ramp generator for generating a ramp waveform; and
      a controller for (i) dynamically determining, during the conduction period and based on the integrated current, when the amount of the accumulated charge is sufficient to generate a predetermined output power from the resonant converter, and (ii) deactivating the input bridge when the amount of the accumulated charge is sufficient to generate the predetermined output power, wherein the integrated current is reset each switching cycle of the input bridge.

17. The system of claim 16, wherein dynamically determining when the amount of the accumulated charge is sufficient comprises comparing the integrated current to the ramp waveform, wherein the ramp waveform models an instantaneous period for the input bridge.

18. The system of claim 16, wherein the ramp waveform is reset each switching cycle of the input bridge.

19. The system of claim 16, wherein a slope of the ramp waveform is based on the predetermined output power.

20. The system of claim 19, wherein the slope is equal to (Pin)/(D*Vin), where Pin is equal to the predetermined output power divided by an efficiency of the resonant converter, Vin is an input voltage to the resonant converter, and D is a duty cycle for a switching waveform of the resonant converter.

* * * * *